(12) United States Patent
Dowlatkhah et al.

(10) Patent No.: US 7,953,829 B2
(45) Date of Patent: May 31, 2011

(54) SYSTEM AND METHOD FOR QUALITY OF SERVICE (QOS) PARAMETER CHANGE

(75) Inventors: Sangar Dowlatkhah, Alpharetta, GA (US); Afsaneh Khajavi, Los Angeles, CA (US); Melanie Jane Sater, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 57 days.

(21) Appl. No.: 12/366,342

(22) Filed: Feb. 5, 2009

(65) Prior Publication Data

US 2010/0198946 A1  Aug. 5, 2010

(51) Int. Cl.
*G06F 15/16* (2006.01)
*G06F 15/177* (2006.01)
(52) U.S. Cl. ......... 709/220; 709/231; 709/203; 725/62; 725/35; 725/74; 725/110

(58) Field of Classification Search .................. 709/220, 709/231, 203
See application file for complete search history.

(56) References Cited

U.S. PATENT DOCUMENTS

| 7,756,157 | B2 * | 7/2010 | Bellwood et al. | 370/468 |
| 2006/0195882 | A1 * | 8/2006 | Tischer et al. | 725/116 |

\* cited by examiner

*Primary Examiner* — Jude J Jean Gilles (57) ABSTRACT

A system and method for redirecting or duplicating a media flow to one or more alternative media presentation devices and providing updated quality of service parameters to the application server providing the media flow. The user of a mobile communication device can manually initiate the media flow change or the user can configure the media flow change to automatically transfer based on the proximity of the mobile communication device to the alternative media presentation device. If desired, the media flow can be reverted to the mobile communication device. A media flow can also be divided, such as by audio and video to different alternative media presentation devices.

20 Claims, 8 Drawing Sheets

SYSTEM AND METHOD FOR QUALITY OF SERVICE (QOS) PARAMETER CHANGE

TECHNICAL FIELD

The subject innovation relates generally to streaming media from an application server to a media presentation device and more specifically, to communicating updated quality of service parameters to an application server for redirecting media flow to one or more devices with different media presentation characteristics.

BACKGROUND

The use of wireless communications devices has become so prevalent in today's society that almost everyone you see is talking on a cell phone or other wireless communication device. The widespread adoption of mobile communication devices has fueled the growth in sophistication of the mobile devices, and their supporting networks, to the point where application servers on the networks stream media such as live video, movies, television programs or music to the mobile devices.

In many circumstances, individuals begin viewing the media using mobile communications devices while they are in transit from one location to another, such as traveling from work to home or from one office location to another office location. Upon arrival at their destination, many media presentation devices with larger and higher resolution displays or better audio systems are available but the user is unable to transfer the media flow from the mobile communication device to the alternative media presentation devices.

Conversely, users viewing media flow presentations on stationary audio and/or video display devices at home or work desire to continue the presentation on their mobile communication device as they depart the location currently displaying the media flow. For example, a user involved in a video conference call at the office has to leave to catch a flight to a meeting at another location but the video conference call has not reached its conclusion. The user desires to transfer the media flow from the office video conferencing system to their mobile communication device so they can depart for the airport in time to catch their flight.

The desire to utilize alternative media presentation devices has created market pressure for a system to allow users to redirect or branch existing media flows from one device to another and update the characteristics of the media flow in the process therefore allowing for transfer between devices having different presentation characteristics.

SUMMARY

The following presents a simplified summary of the specification in order to provide a basic understanding of some aspects of the specification. This summary is not an extensive overview of the specification. The simplified summary will not identify key or critical elements of the specification nor delineate the scope of the specification. Its sole purpose is to present some concepts of the specification in a simplified form as a prelude to the more detailed description presented later.

The disclosure describes a system and methods for providing the user the ability to inform an application server of the user's desire to branch a media flow from one media presentation device to one or more alternative media presentation devices or to divert a media flow from one media presentation device to another media presentation device. The user can manually initiate the media flow transfer from a menu system provided on the mobile communication.

Further, the disclosure describes a system and methods allowing the user to configure the system for automatic branching or transfer of a media flow based on the proximity of the device currently displaying the media flow to an alternative media presentation device. In another aspect, the system and methods permit the user to split the media flow into audio and visual components and send the divided components to different media presentation devices.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Further, terms like "user equipment," "mobile station," "mobile," "subscriber station," "access terminal," "terminal," "handset," "machine", and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component that serves and receives data, control, voice, video, sound, gaming, or substantially any data-stream or signaling-stream from a set of subscriber stations. Data and signaling streams can be packetized or frame-based flows.

Moreover, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Figure 1:
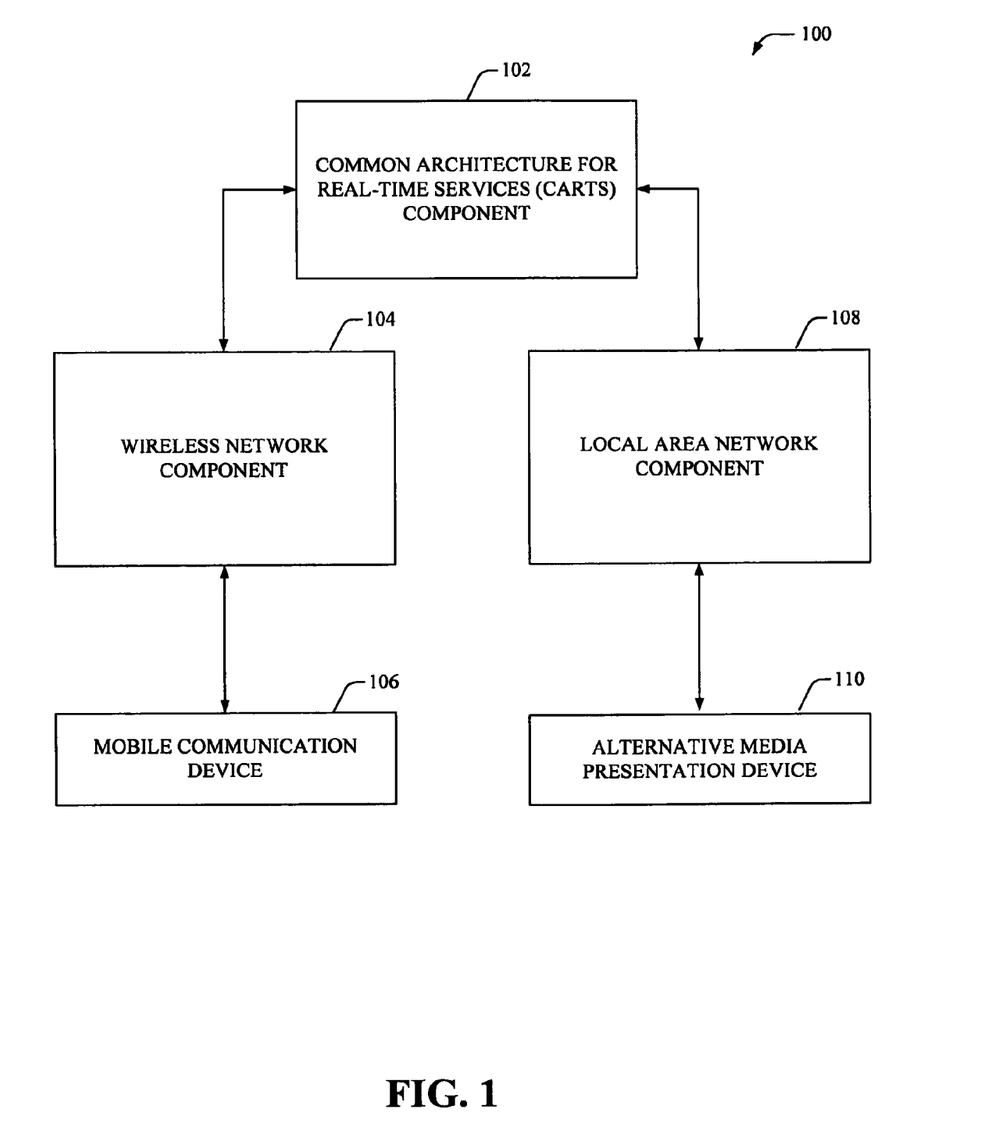
FIG. 1 illustrates an embodiment of a communication network with the user's mobile communication device and an alternative media presentation device.

Referring initially to FIG. 1, illustrated is a communication network 100. The communication network 100 comprises a common architecture for real-time services (CARTS) component 102, a wireless communication network 104, a mobile communication device 106, a local area network 108 and an alternative media presentation device 110. It should be noted that the illustration presents those portions of the communication network necessary to describe the subject innovation. Further, it should be noted that the system can include one or more alternative media presentation devices simultaneously.

The common architecture for real-time services (CARTS) component 102 provides network functionality including but not limited to the application server (AS), the home subscriber server (HSS), the call session control function (CSCF) and the associated session border control (SBC) modules. The application server provides the ability to redirect, duplicate or divide the media flow based on parameter changes provided by the mobile communication device. The home subscriber server provides a database for registering servers and services allowing the application server to determine the location of the alternative media presentation device(s). The call session control function provides the necessary handshaking and control functions to allow the establishment of the communication session and media flow between the mobile communication device and the application server and the further establishment of the communication session and media flow between the application server and the alternative media presentation device.

The wireless network component 104 provides the network communication capability allowing the mobile communication device to establish and maintain wireless communications with the common architecture for real-time services component 102 and its associated application servers. Although this disclosure provides exemplary networks for describing the subject innovation, the subject innovation is not limited to the presented networks but includes all communication network domains.

The mobile communication device 106 provides the ability to establish an initial communication session with the application server and present media on the mobile communication device 106. Further, the mobile communication device provides the user interface to instruct the application server to duplicate or divert the media flow to an alternative media presentation device 110 selected from the menu system of the mobile communication device 106. In another aspect, the user can configure the mobile communication device 106 to automatically instruct the application server to redirect the media flow to an alternative media display device 110 based on the mobile communication device's proximity to the alternative media presentation device 110.

The local area network 108 provides communications between the alternative media presentation device residing on the local area network 108 and the application server residing on the wireless network. The local area network can be a wired or a wireless network and includes but is not limited to home networks such as the IEEE 802.11 a/b/g/n standards. In another aspect, the local area network can include a Bluetooth standard network for proximity determination.

The alternative media presentation device 110 provides the ability to present the media flow in a format different from the format configured for the original presentation. For example, the media flow can be redirected to a high-resolution monitor on the user's desktop computer or to a high definition television in the user's home. In another example, the media flow video can be redirected to a high definition display device as described above while the audio is redirected to the user's home stereo surround sound audio system or remains on the user's mobile communication device.

Figure 2:
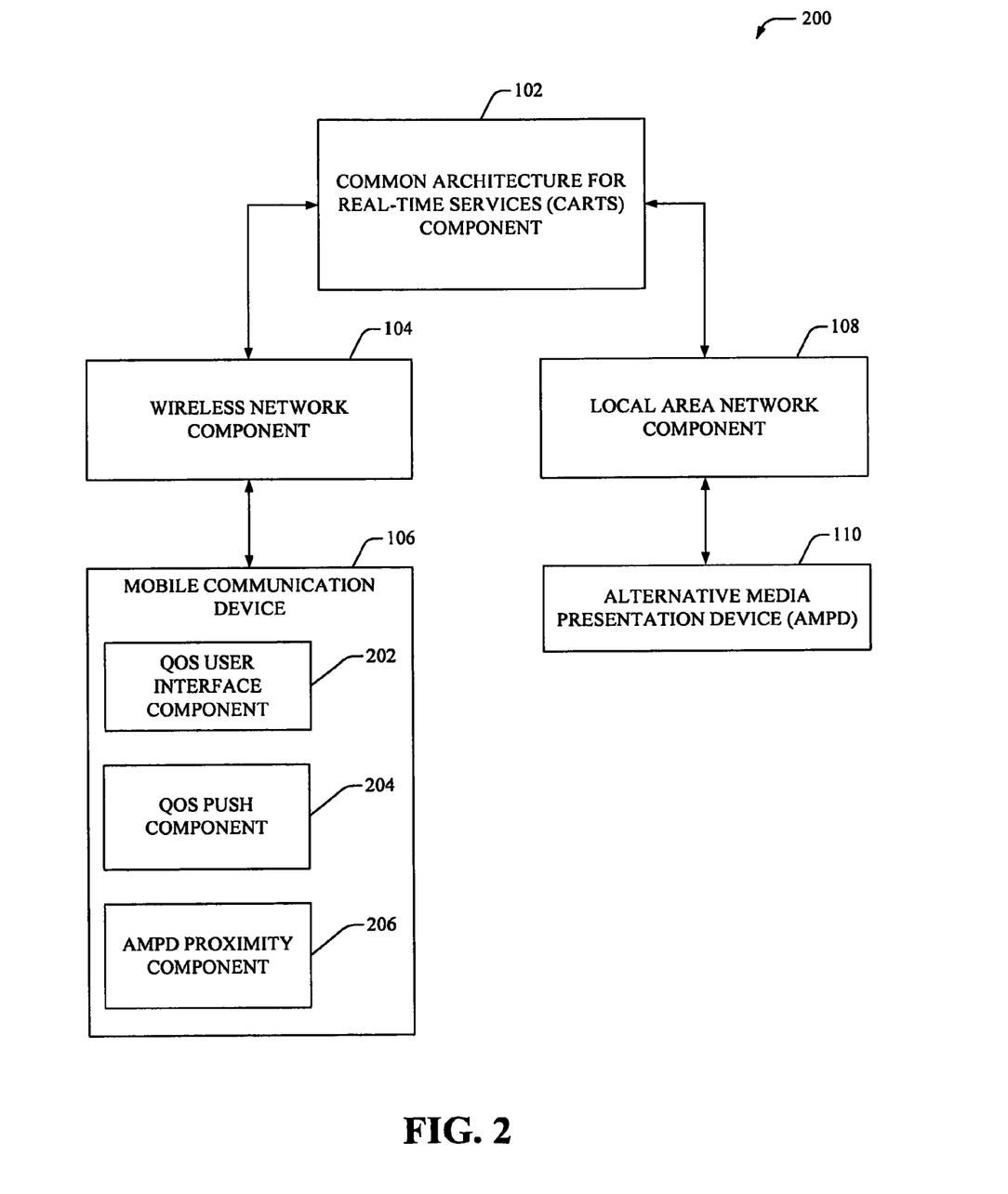
FIG. 2 illustrates an embodiment of a communication network with the user's mobile communication device and an alternative media presentation device, including the user interface on the mobile communication device supporting changing the quality of service characteristics of the media flow for an alternative media presentation device.

In another aspect of the subject innovation, FIG. 2 depicts the mobile communication device 106 of a wireless network including the quality of service (QoS) user interface component 202, the quality of service push component 204 and the alternative media presentation device proximity (AMPD) component 206. The mobile communication device and the described functionality allows the user to select an alternative device while a media flow is in progress and duplicate or redirect the media flow to the alternative media presentation device 110. Further, the user can select the alternative media presentation device 110 before beginning the media flow allowing the presentation of the media flow to others at the same or a different location.

In one aspect, the quality of service user interface component 202 provides the user the ability to select available alternative media presentation devices 110 for the media flows. The alternative media presentation devices 110 can be other devices on the wireless network 104 or devices on the local area network. For example, the user can select another user's mobile communication device for duplication of the media flow or the user can select a high definition television on the user's home local area network 108 for redirection of the media flow. Further, the user can select one alternative media presentation device 110 destination for the video component of the media flow and another alternative media presentation device 110 destination for the audio component of the media flow.

In another aspect of the quality of service user interface component 202, the user can configure redirections, duplications and/or divisions of media flow based on the location of the mobile communication device 106. For example, the user arrives home while viewing a media flow on the mobile communication device 106. The mobile communication device 106 detects the location as within range of the user's high definition television and audio system and initiates a redirection and division of the media flow. The video component of the media flow is redirected to the user's high definition television and the audio component of the media flow is redirected to the user's audio system.

The quality of service push component 204 provides the ability to notify the application server via the home subscriber server that the user desires to modify the current quality of service parameters. For example, the user can redirect the media flow to a larger display because the user has arrived at a location with a larger display known to the network repository. In another example, the user can redirect a media flow from a larger display at the user's home to the user's mobile communication device 106 because the user is leaving home and desires to continue viewing the media flow. Further, the user can duplicate the media flow to other alternative media presentation devices 110 such as other user's home displays or mobile communication devices 106 because the user desires to share the media flow as a audio/video conference.

The alternative media presentation device proximity component 206 provides the ability for the mobile communication device 106 to detect its location with respect to alternative media presentation devices. If the definition of the alternative media presentation devices 110 exists in the network repository then the user can configure the mobile communication device 106, through the quality of service user interface component 202, to present a menu allowing the user to select the alternative media presentation device 110. After the mobile communication device 106 comes within the predefined range of the alternative media presentation device 110, the quality of service push component 204 will instruct the application server via the home subscriber server to automatically redirect the media flow to the alternative media presentation device 110. If desired, the user can configure the mobile communication device to present a menu allowing manual selection of the alternative media presentation device 110 once the mobile communication device 106 comes within the predefined range of the alternative media presentation device 110.

In another aspect of the media presentation device proximity component 206, if the detected device is not defined in the home subscriber server, then the user is presented an option of adding the alternative media presentation device 110 to the home subscriber server so it is available for media flow display as directed by the mobile communication device 106. For example, the user arrives at a customer location and the customer permits the user's mobile communication device 106 to enter the customer's local area network 108. The user's mobile communication device 106 next detects a high-resolution monitor in the customer's conference room and presents the user a menu to add the high resolution monitor to the network repository. After adding the high resolution monitor, the user forwards the media flow of his presentation from his mobile communication device 106 to the customer's high resolution monitor and continues his presentation.

Figure 3:
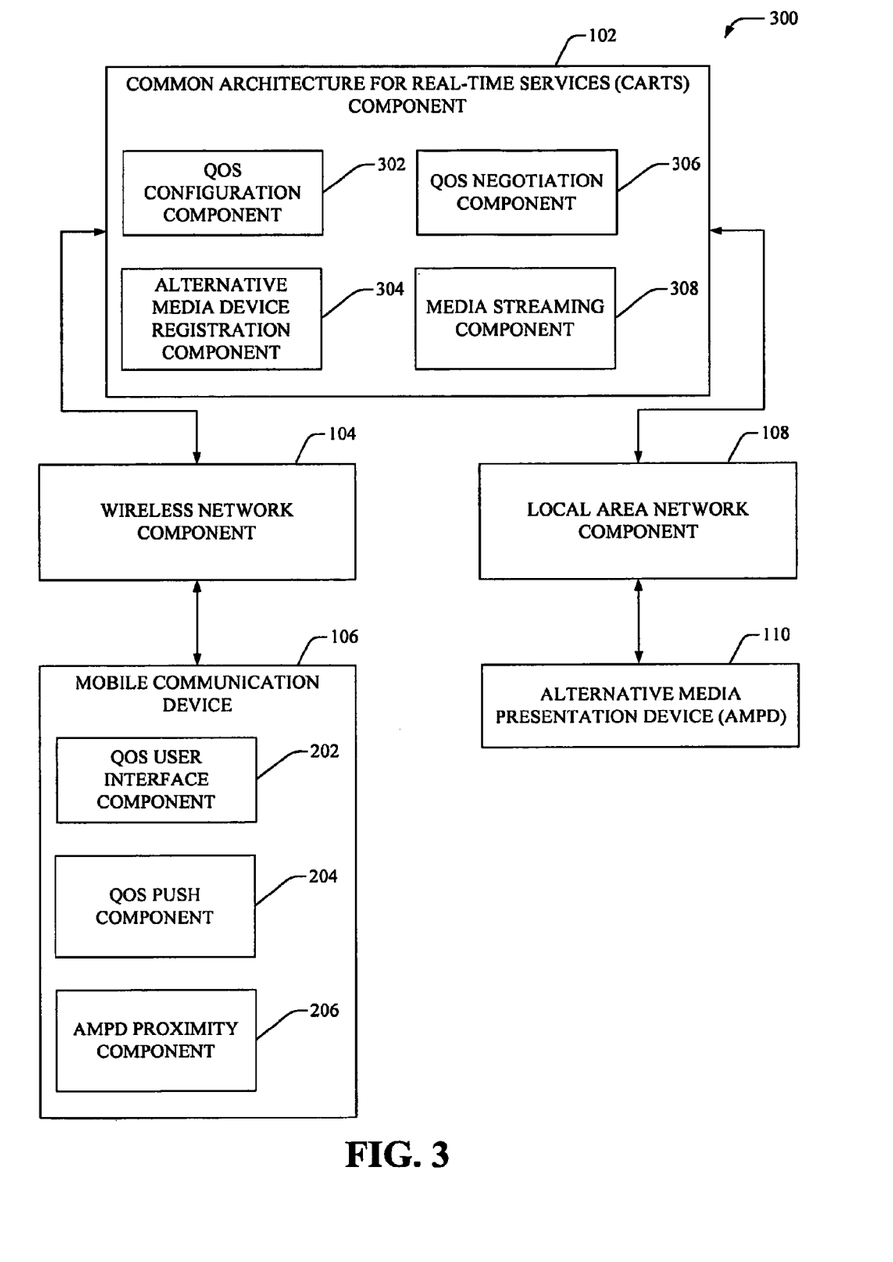
FIG. 3 illustrates an embodiment of a communication network with the user's mobile communication device and an alternative media presentation device, including the Common Architecture for Real-Time Services component providing support for configuring an initial quality of service for a media flow, registering an alternative media device, negotiating new quality of service characteristics and streaming media to one or more media presentation devices.

Next, FIG. 3 depicts the common architecture for real-time services component 102 including the quality of service configuration component 302, the communication device registration component 304, the quality of service negotiation component 306 and the media streaming component 308. The common architecture for real-time services component 102 is embedded in the wireless network 104 and can be implemented in one or more servers communicatively connected to the wireless network 104. It is noted that the common architecture for real-time services comprises other components that are not part of this disclosure.

The quality of service configuration component 302 provides the ability for the user to configure the home subscriber server 408 to include alternative media presentation devices 110 of interest to the user. The configuration includes but is not limited to type of alternative media presentation device 110, display resolution of the alternative media presentation device 110, availability of alternative media presentation device 110, authorized users of the alternative media presentation device 110, mobile communication devices permitted access to the alternative media presentation device 110, friendly menu name for the alternative media presentation device and proximity range for the alternative media presentation device. The provided configuration is maintained in a database managed by the home subscriber server 408.

The communication device registration component 304 provides the ability for the registration of devices previously configured for alternative media presentation. After registration of an alternative media presentation device 110, the alternative media presentation device is available for selection by the quality of service user interface component 202 of the mobile communication device. For example, once the user desires to transfer the media flow to an alternative media presentation device 110, the can user select a device from the list of configured devices. After selection, the device is located from its entry in the home subscriber server database and is registered with the application server for creating a session between the alternative media presentation device 110 and the application server.

The quality of service negotiation component 306 determines the capabilities of the alternative media presentation device 110 and provides the parameters of the selected alternative media presentation device 110 to the media streaming component 308. For example, after the quality of service negotiating component receives the user's selection, the home subscriber server database is interrogated for the parameters associated with the selection.

The quality of service negotiation component 306 next validates the availability of the selected alternative media presentation device 110. In another aspect, the user's selection can include more than one alternative media presentation device 110. For example, the user can select a high-definition television for the video component of the media flow and a surround sound audio system for the audio component of the media flow. The quality of service negotiation component then selects the optimal quality of service parameters based on the communication path between the application server and the alternative media presentation device 110.

The media streaming component 308 provides the ability to redirect, duplicate or divide a media flow from its original destination at a mobile communication device 106 to one or more alternative media presentation devices 110. The media streaming component can provide the same media flow to devices having different quality of service requirements simultaneously. For example, the media streaming component 308 can continue to provide the media flow to the mobile communication device 106 while duplicating the media flow to a high resolution monitor and dividing the media flow by providing the audio component to the mobile communication device 106 and to the user's desktop computer for rendition by the computer's sound card.

In another aspect, the media streaming component can eliminate the duplicated and redirected media flows provided to the alternative media presentation devices and return to a media flow provided to the mobile communication device 106. For example, if a user initiates a session at home, the user can view the redirect the media flow to his high definition television. If the user leaves home before the end of the media flow, the user can cancel the component of the media flow to the alternative media presentation device 110, the high definition television in this case, and continue with the presentation on the mobile communication device while traveling to the office. After arriving at the office, the user can then redirect the media flow to the user's desktop computer for the duration of the media flow. It should be noted that these media flow changes can also occur automatically based on the mobile communication device's 106 alternative media presentation device proximity component 206.

Figure 4:
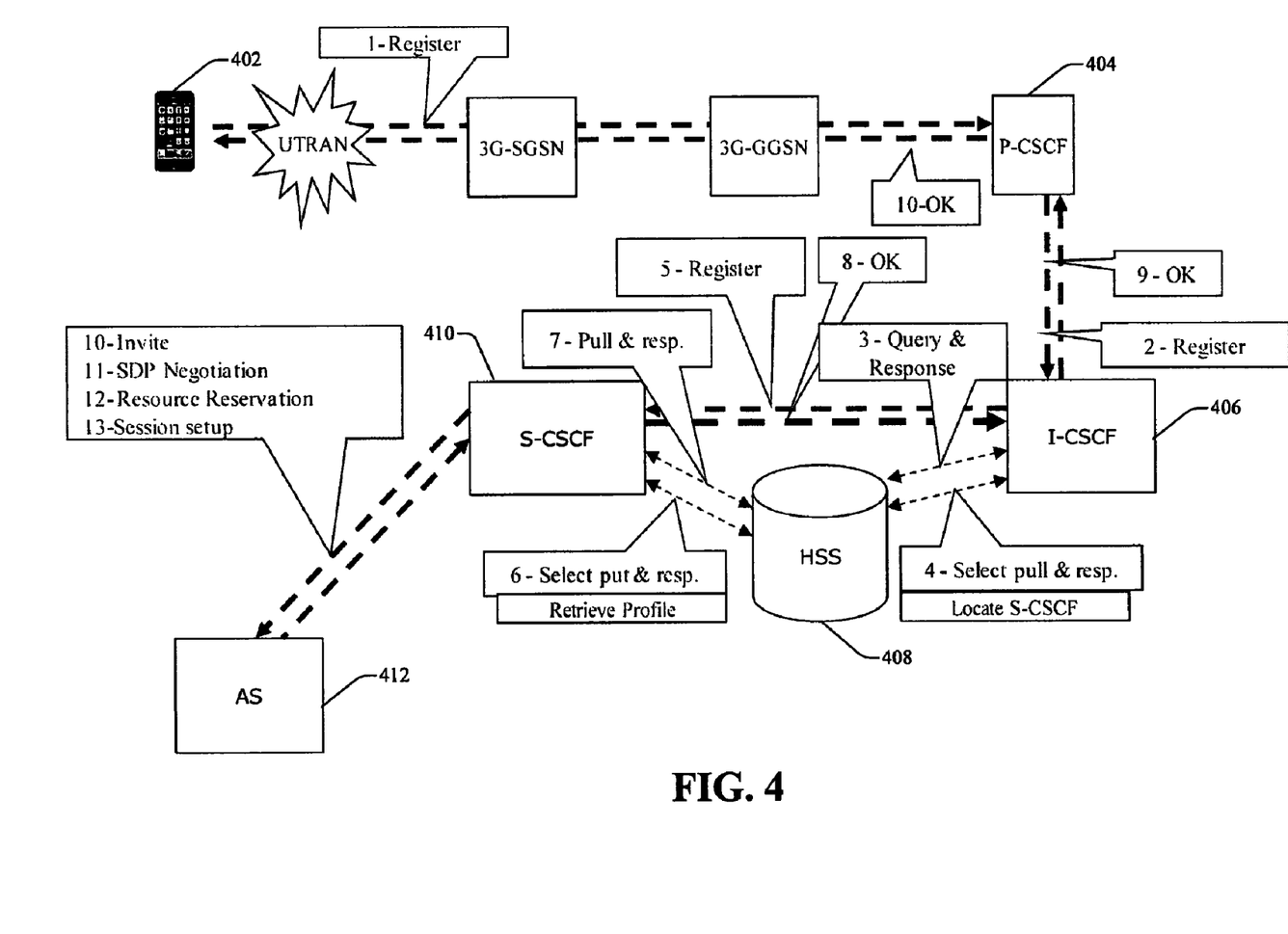
FIG. 4 illustrates an example method of service registration and configuration for a media flow to a mobile communication device.

FIG. 4 depicts the service registration and setup for the initial media flow of the subject innovation. Included are the mobile communication device 402, the proxy call session control function (P-CSCF) 404, the interrogating call session control function (I-CSCF) 406, the home subscriber server (HSS) 408, the serving call session control function (S-CSCF) 410 and the application server (AS) 412. To initiate a media flow, the user must first register the mobile communication device 402 with the wireless network 104.

The mobile communication device, through the proxy call session control function 404, establishes communication with the interrogating call session control function 406. Once the mobile communication device 402 establishes communications with the interrogating call session control function 406, the interrogating call session control function queries the home subscriber server 408 for the identity of the serving call session control function 410 associated with the application server. After determining the identity of the appropriate serving call session control function 410 the interrogating call session control function 406 establishes communications with the serving call session control function 410 and requests registration of the mobile communication device 402.

The serving call session control function 410 then requests the mobile communication device profile from the home subscriber server 408 and establishes communication with the application server 412. The application server 412 then negotiates the parameters associated with the configuration of the mobile communication device and reserves the resources necessary to conduct the desired media flow between the mobile communication device 402 and the application server 412. Once these tasks are complete, the session is established and the media flow can begin.

Figure 5:
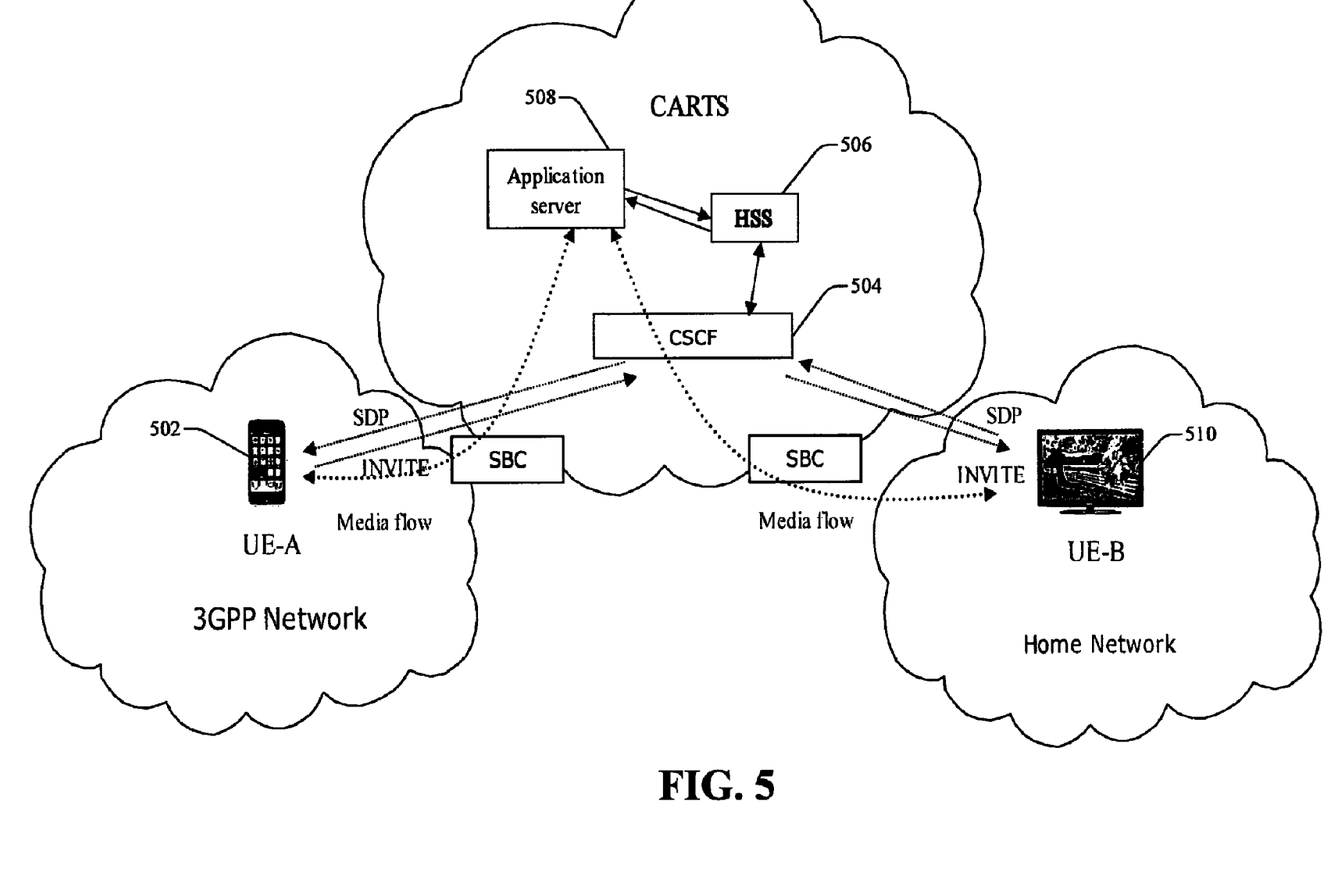
FIG. 5 illustrates an embodiment of a communication network with the user's mobile communication device and an alternative media presentation device, including media flow diverted to an alternative media presentation device.

FIG. 5 depicts the user's mobile communication device 502 selecting an alternative media presentation device 510 for display of the current media flow. Initially the user selects the alternative media presentation device 510 from a selection menu on the mobile communication device 502 display. The mobile communication device 502 sends a request through the call session control function 504 requesting the application server 508 to branch the media flow to the alternative media presentation device 510. The application server 508 interrogates the home subscriber server 506 database for the quality of service parameters for the selected alternative media presentation device 510. It should be noted the home subscriber server can be one of many network repositories on the wireless network.

After the home subscriber server 506 provides the requested information, the application server 508 establishes communication with the alternative media presentation device 510 and negotiates the quality of service parameters for the pending media flow. For example, the alternative media presentation device 510 can negotiate the display size and resolution available to the application server 508. Once the negotiation successfully completes, the application server 508 begins streaming the media flow to the alternative media presentation device 510. It is noted that the media flow to the mobile communication device 502 can continue simultaneously if the user desires.

Figure 6:
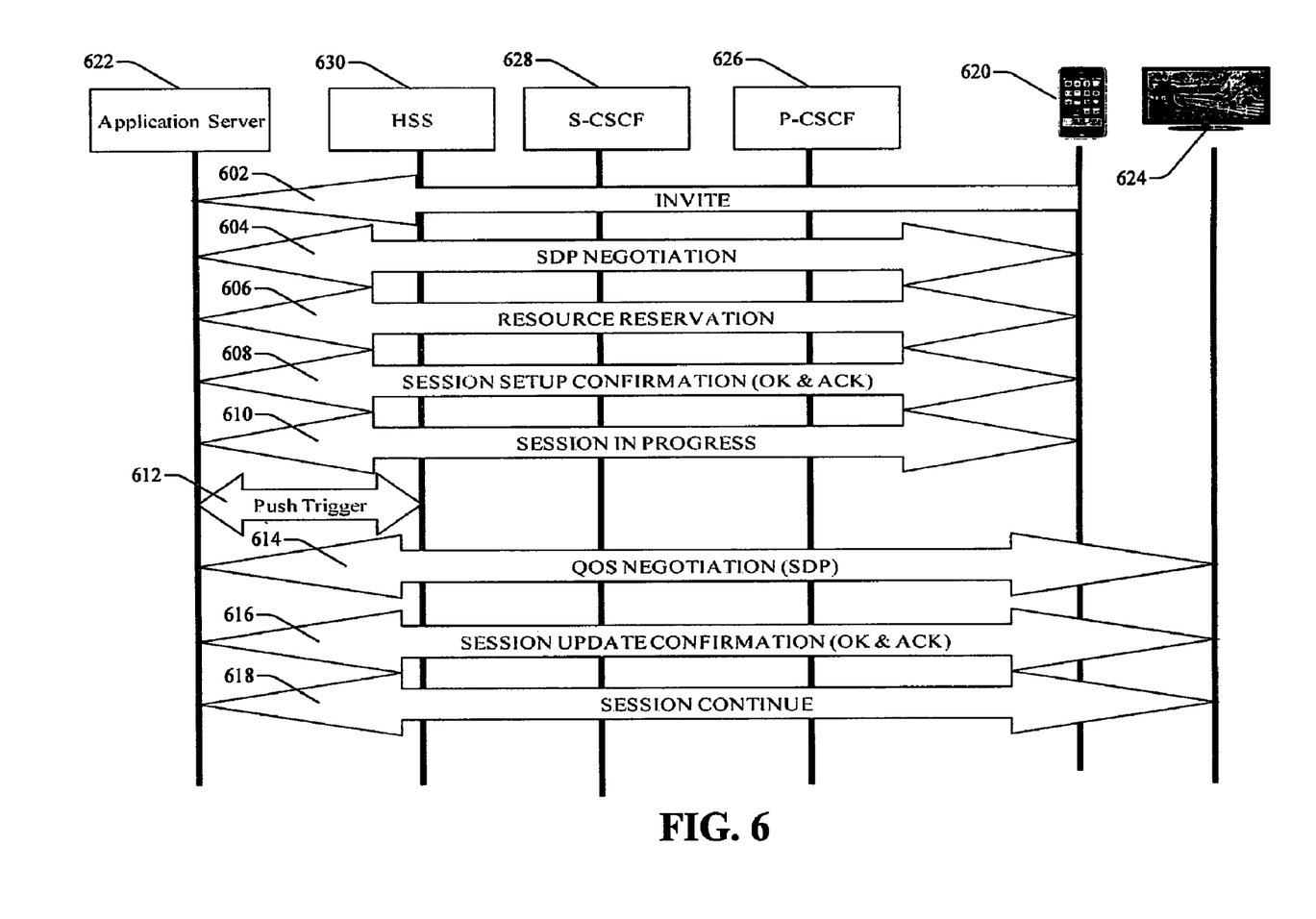
FIG. 6 illustrates an example method a media flow diverted from a mobile communication device to an alternative media presentation device.

Next, FIG. 6 depicts a flowchart representing a method of changing quality of service parameters. First, at step 602, the mobile communication device 620 initiates communication with the wireless network, illustrated by the proxy call session control function 626, the serving call session control function 628 and the home subscriber server 630 and sends an invitation to the application server 622 to create a media flow session. Next, at step 604, the mobile communication device 620 and the application server 622 negotiate the quality of service parameters of the mobile communication device 620 to establish the requirements of the media flow.

Next, at step 606, resources are reserved by the application server 622, the wireless network 626, 628, 630 and the mobile communication device 620 to support the quality of service supported by the mobile communication device. Further, at step 608, acknowledgments are transmitted along the communication path between the mobile communication device 620 and the application server 622 to provide notice that the path and all devices are prepared to begin the media flow. Next, at step 610, the application server 622 begins the media flow to the mobile communication device 620.

Subsequently, the user decides to transfer the media flow to an alternative media presentation device 624 and selects the alternative media presentation device 624 from the selection menu on the mobile communication device 620. Next at step 612, the application server obtains the identity and location of the alternative media presentation device 624 from the home subscriber server 630. Next, at 614, the application server negotiates the quality of service requirements with the alternative media presentation device 624. As described for the negotiation above between the application server 622 and the mobile communication device 620, the application server 622 and the alternative media presentation device agree on the quality of service parameters necessary for optimal presentation on the alternative media presentation device 624. Next, at step 616, acknowledgements are sent by devices along the communication path between the application server 622 and the alternative media presentation device to confirm that all devices in the path of the media flow have updated their resource requirements and are prepared for the transmission of the media flow based on the new quality of service parameters. Next, at step 618, the application server 622 begins streaming the media flow supporting the new quality of service parameters to the alternative media presentation device.

Figure 7:
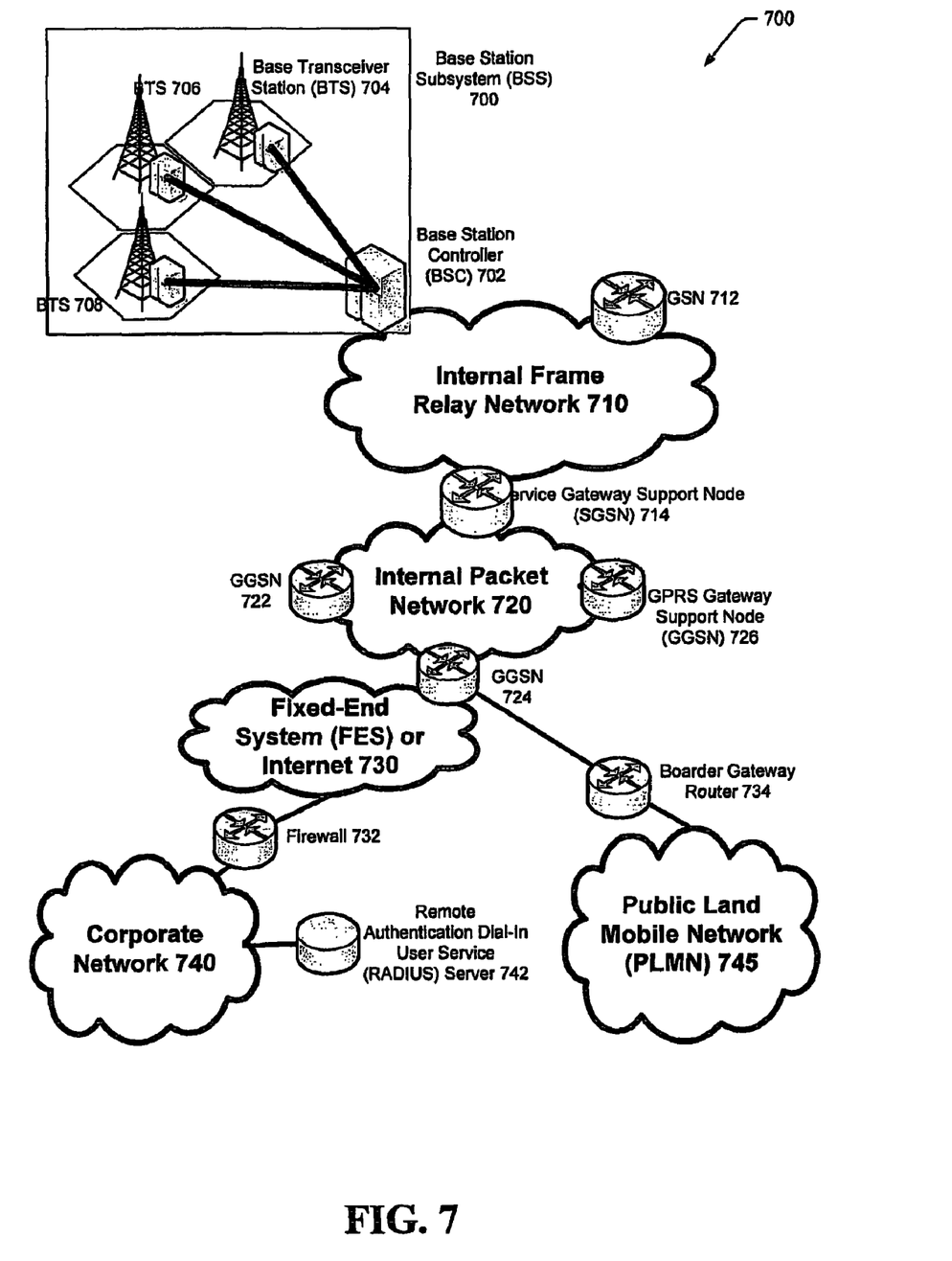
FIG. 7 illustrates an overview of an exemplary, non-limiting network environment suitable for service by various embodiments.

Looking next to FIG. 7, depicted is an overall block diagram of an exemplary packet-based mobile cellular network environment, such as a GPRS network, in which the invention may be practiced. In such an environment, there are a plurality of Base Station Subsystems ("BSS") 700 (only one is shown), each of which comprises a Base Station Controller ("BSC") 702 serving a plurality of Base Transceiver Stations ("BTS") such as BTSs 704, 706, and 708. BTSs 704, 706, 708, etc. are the access points where users of packet-based mobile devices become connected to the wireless network. In exemplary fashion, the packet traffic originating from user devices is transported over the air interface to a BTS 708, and from the BTS 708 to the BSC 702. Base station subsystems, such as BSS 700, are a part of internal frame relay network 710 that may include Service GPRS Support Nodes ("SGSN") such as SGSN 712 and 714.

Each SGSN is in turn connected to an internal packet network 720 through which a SGSN 712, 714, etc. can route data packets to and from a plurality of gateway GPRS support nodes (GGSN) 722, 724, 726, etc. As illustrated, SGSN 714 and GGSNs 722, 724, and 726 are part of internal packet network 720. Gateway GPRS serving nodes 722, 724 and 726 mainly provide an interface to external Internet Protocol ("IP") networks such as Public Land Mobile Network ("PLMN") 745, corporate intranets 740, or Fixed-End System ("FES") or the public Internet 730. As illustrated, subscriber corporate network 740 may be connected to GGSN 724 via firewall 732; and PLMN 745 is connected to GGSN 724 via boarder gateway router 734. The Remote Authentication Dial-In User Service ("RADIUS") server 742 may be used for caller authentication when a user of a mobile cellular device calls corporate network 740.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 8:
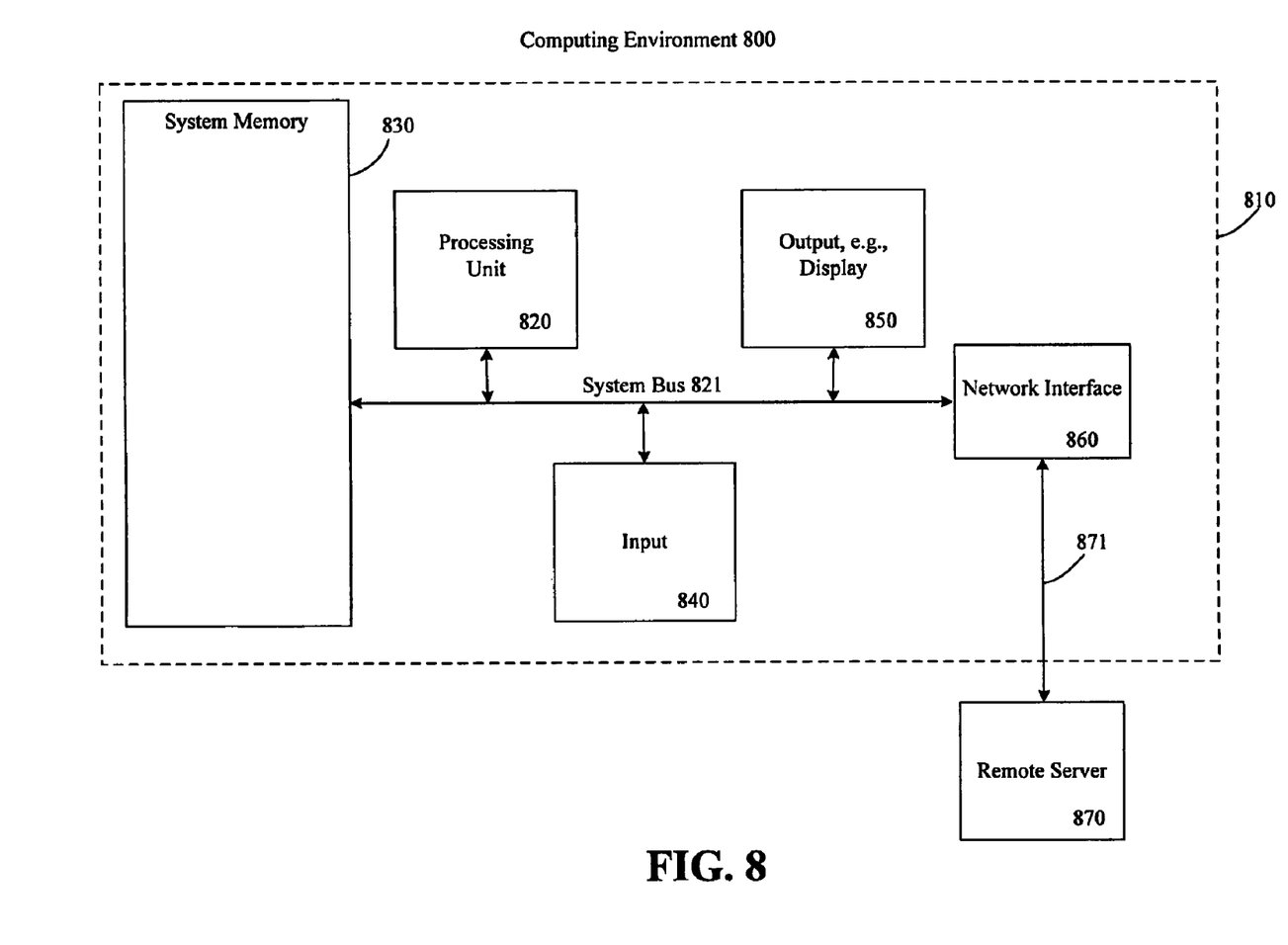
FIG. 8 illustrates a block diagram of an exemplary, non-limiting operating environment in which various aspects described herein can function.

FIG. 8 illustrates an example of a suitable computing system environment 800 implementing the claimed subject matter. Although as made clear above, the computing system environment 800 is only one example of a suitable computing environment for a mobile device and is not intended to suggest any limitation as to the scope of use or functionality of the claimed subject matter. Further, the computing environment 800 is not intended to suggest any dependency or requirement relating to the claimed subject matter and any one or combination of components illustrated in the example operating environment 800.

With reference to FIG. 8, an example of a remote device for implementing various aspects described herein includes a general purpose computing device in the form of a computer 810. Components of computer 810 can include, but are not limited to, a processing unit 820, a system memory 830, and a system bus 821 that couples various system components including the system memory to the processing unit 820. The system bus 821 can be any of several types of bus structures including a memory bus or memory controller, a peripheral bus, and a local bus using any of a variety of bus architectures.

Computer 810 can include a variety of computer readable media. Computer readable media can be any available media accessible by computer 810. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium suitable to store the desired information and which can be accessed by computer 810.

Communication media can embody computer readable instructions, data structures, program modules or other data in a modulated data signal such as a carrier wave or other transport mechanism and can include any suitable information delivery media.

The system memory 830 can include computer storage media in the form of volatile and/or nonvolatile memory such as read only memory (ROM) and/or random access memory (RAM). A basic input/output system (BIOS), containing the basic routines that help to transfer information between elements within computer 810, such as during start-up, can be stored in memory 830. Memory 830 can also contain data and/or program modules that are immediately accessible to and/or presently being operated on by processing unit 820. By way of non-limiting example, memory 830 can also include an operating system, application programs, other program modules, and program data.

The computer 810 can also include other removable/non-removable, volatile/nonvolatile computer storage media. For example, computer 810 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 821 through a non-removable memory interface such as an interface, and a magnetic disk drive or optical disk drive can be connected to the system bus 821 by a removable memory interface, such as an interface.

A user can enter commands and information into the computer 810 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 820 through user input 1040 and associated interface(s) that are coupled to the system bus 821, but can be connected by other interface and bus structures, such as a parallel port, game port or a universal serial bus (USB). A graphics subsystem can also be connected to the system bus 821. In addition, a monitor or other type of display device can be connected to the system bus 821 via an interface, such as output interface 850, which can in turn communicate with video memory. In addition to a monitor, computers can also include other peripheral output devices, such as speakers and/or a printer, which can also be connected through output interface 850.

The computer 810 can operate in a networked or distributed environment using logical connections to one or more other remote computers, such as remote server 870, which can in turn have media capabilities different from device 810. The remote server 870 can be a personal computer, a server, a router, a network PC, a peer device or other common network node, and/or any other remote media consumption or transmission device, and can include any or all of the elements described above relative to the computer 810. The logical connections depicted in FIG. 10 include a network 871, such a local area network (LAN) or a wide area network (WAN), but can also include other networks/buses. Such networking environments are commonplace in homes, offices, enterprise-wide computer networks, intranets and the Internet.

When used in a LAN networking environment, the computer 810 connects to the LAN 1071 through a network interface or adapter. When used in a WAN networking environment, the computer 810 can include a communications component, such as a modem, or other means for establishing communications over the WAN, such as the Internet. A communications component, such as a modem, which can be internal or external, connects to the system bus 821 via the user input interface at input 840 and/or other appropriate mechanism. In a networked environment, program modules depicted relative to the computer 810, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A non-transitory computer-readable media encoded with a computer program for a system for communicating quality of service parameters between a network repository and an application server, the system comprising:
- a quality of service interface component for selecting an alternative media presentation device;
- a quality of service push component for instructing the application server to direct a media flow to the alternative media presentation device;
- a quality of service configuration component for configuring and storing the alternative media presentation device quality of service parameters;
- a communication device registration component for registering previously configured alternative media presentation devices;
- a quality of service negotiation component for negotiating one or more acceptable quality of service parameters between the application server and the alternative media presentation device; and
- a media streaming component for changing the media flow to meet the negotiated one or more acceptable quality of service parameters.

2. The system of claim 1, wherein the quality of service interface component provides for selecting multiple alternative media presentation devices.

3. The system of claim 1, wherein the quality of service interface component provides for selecting different alternative media presentation devices for at least one of an audio or video component of the media flow.

4. The system of claim 1, wherein the quality of service push component provides for a user manually initiating the media flow to the alternative media presentation device.

5. The system of claim 1, wherein the quality of service push component provides for a user configuring an automatic initiation of the media flow to the alternative media presentation device.

6. The system of claim 1, wherein the quality of service configuration component provides for grouping alternative media presentation device configurations based on local area network membership.

7. The system of claim 1, wherein the quality of service configuration component provides for configuring proximity information between a mobile communication device and the alternative media presentation device to trigger media flow to the alternative media presentation device.

8. The system of claim 1, wherein the communication device registration component provides for specifying an availability schedule for the alternative media presentation device.

9. The system of claim 1, wherein the communication device registration component provides for validating a user's authorization to access the alternative media presentation device.

10. The system of claim 1, wherein the quality of service negotiating component determines a highest available quality of service parameters based on a communication path between the application server and the alternative media presentation device.

11. The system of claim 1, wherein the media streaming component provides independent streams of different quality of service parameters to different alternative media presentation devices.

12. The system of claim 1, wherein the media streaming component divides the media flow into an audio component and a video component and provides the divided components to different alternative media presentation devices.

13. A method, stored in a memory and executing on a processor in a device, for communicating quality of service parameters between a network repository and an application server, the system comprising:
- configuring the network repository with alternative media presentation device quality of service parameters;
- selecting an alternative media presentation device from a mobile communication device;
- registering the alternative media presentation device with the application server;
- negotiating one or more quality of service parameters between the application server and the alternative media presentation device; and
- streaming a media flow from the application server to the alternative media presentation device.

14. The method of claim 13, further comprising, creating groups of alternative media presentation devices based on membership in a local area network.

15. The method of claim 13, further comprising, denying selection of a particular alternative media presentation device based on an alternative media presentation device unavailability.

16. The method of claim 13, further comprising, automatically selecting the alternative media presentation device based on proximity of the mobile communication device to the alternative media presentation device.

17. The method of claim 13, further comprising, sending audio and video components of the media flow to different alternative media presentation devices.

18. A system for communicating quality of service parameters between a network repository and an application server, the system comprising:
- means for selecting an alternative media presentation device, wherein the means for selecting instructs the application server to direct a media flow to the alternative media presentation device;
- means for configuring and storing the alternative media presentation device quality of service parameters;
- means for registering previously configured alternative media presentation devices;
- means for negotiating one or more acceptable quality of service parameters between the application server and the alternative media presentation device; and
- means for changing the media flow to meet the negotiated one or more acceptable quality of service parameters.

19. The system of claim 18, further comprising, means for dividing the media flow between two or more alternative media presentation devices.

20. The system of claim 18, further comprising, means for validating authorization for access to the selected alternative media presentation devices.

* * * * *